(12) United States Patent
Chou

(10) Patent No.: US 7,390,166 B2
(45) Date of Patent: Jun. 24, 2008

(54) ROTARY STRUCTURE FOR RADIATION FANS

(75) Inventor: Chin-Wen Chou, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 204 days.

(21) Appl. No.: 11/272,713

(22) Filed: Nov. 15, 2005

(65) Prior Publication Data

US 2007/0108858 A1     May 17, 2007

(51) Int. Cl.
*F04D 29/056* (2006.01)

(52) U.S. Cl. .................................. 415/220; 417/423.12

(58) Field of Classification Search ............... 415/220, 415/216.1; 416/244 R; 417/423.12
See application file for complete search history.

(56) References Cited

U.S. PATENT DOCUMENTS

| 6,309,190 | B1 * | 10/2001 | Chen ..................... 417/423.1 |
| 2005/0265834 | A1 * | 12/2005 | Wang et al. ................ 415/220 |

* cited by examiner

*Primary Examiner*—Richard Edgar
(74) *Attorney, Agent, or Firm*—Muncy, Geissler, Olds & Lowe, PLLC

(57) ABSTRACT

A rotary structure for radiation fans mainly includes a seat for housing a radiation fan and two brackets coupling with the seat to hold two sleeves. The two sleeves are coupled with two rotary ends of a spindle of the radiation fan to confine the spindle to rotate about a single axis. Thereby the spindle can rotate without skewing while the radiation fan is operating, and impact and noise generation can be prevented.

7 Claims, 5 Drawing Sheets

ROTARY STRUCTURE FOR RADIATION FANS

FIELD OF THE INVENTION

The present invention relates to a rotary structure for radiation fans and particularly to a rotary structure to allow a radiation fan to rotate about a single axis to reduce noise.

BACKGROUND OF THE INVENTION

Radiation fans aim to generate airflow to disperse heat. They have many types depending on use environments and utilization. As the technology advances, industries such as those in information and communication progress rapidly. The demand for radiation fans used on delicate electronic products also grows significantly. The delicate electronic products require the radiation fans that have a greater power and higher rotation speed and are constructed at a smaller size to generate airflow to lower the high temperature being generated so that they can maintain desired operation efficiency within a selected temperature range. If the heat energy generated during product operation cannot be dispelled effectively, the elements could be damaged or catch fire because of excessive high temperature. The consequence could be severe. Hence most delicate electronic products are equipped with radiation fans to dispel heat.

A conventional improved radiation fan structure mainly includes a radiation fan which has radial vanes and a seat which has a rotation space to house the radiation fan. The seat has a circuit board and a coil set to receive electric power to drive the radiation fan to rotate. The radiation fan has a spindle in the center. The seat has a bearing corresponding to the spindle. In the present technique, due to the constraint of the installable size of the radiation fan, the efficiency of the radiation fan is determined by the rotation speed thereof. But during high speed rotation, excessive friction occurs between the spindle and the bearing, and high temperature is generated. As a result, the spindle easily skews and hits the bearing, and abnormal noise is generated. To remedy these problems, wearing-resistant ceramic bearings have been developed. However, the ceramic bearings have a higher hardness and are more difficult to fabricate. The problem of high temperature generated by friction also remains unsolved.

SUMMARY OF THE INVENTION

The primary object of the present invention is to solve the aforesaid disadvantages. The present invention mainly includes a seat for holding a radiation fan and two brackets located on the seat to hold two sleeves. The two sleeves are coupled with two rotary ends of a spindle of the radiation fan to allow the spindle to rotate about a single axis. Thus the radiation fan can rotate smoothly without skewing and impact, so that noise generation can be prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
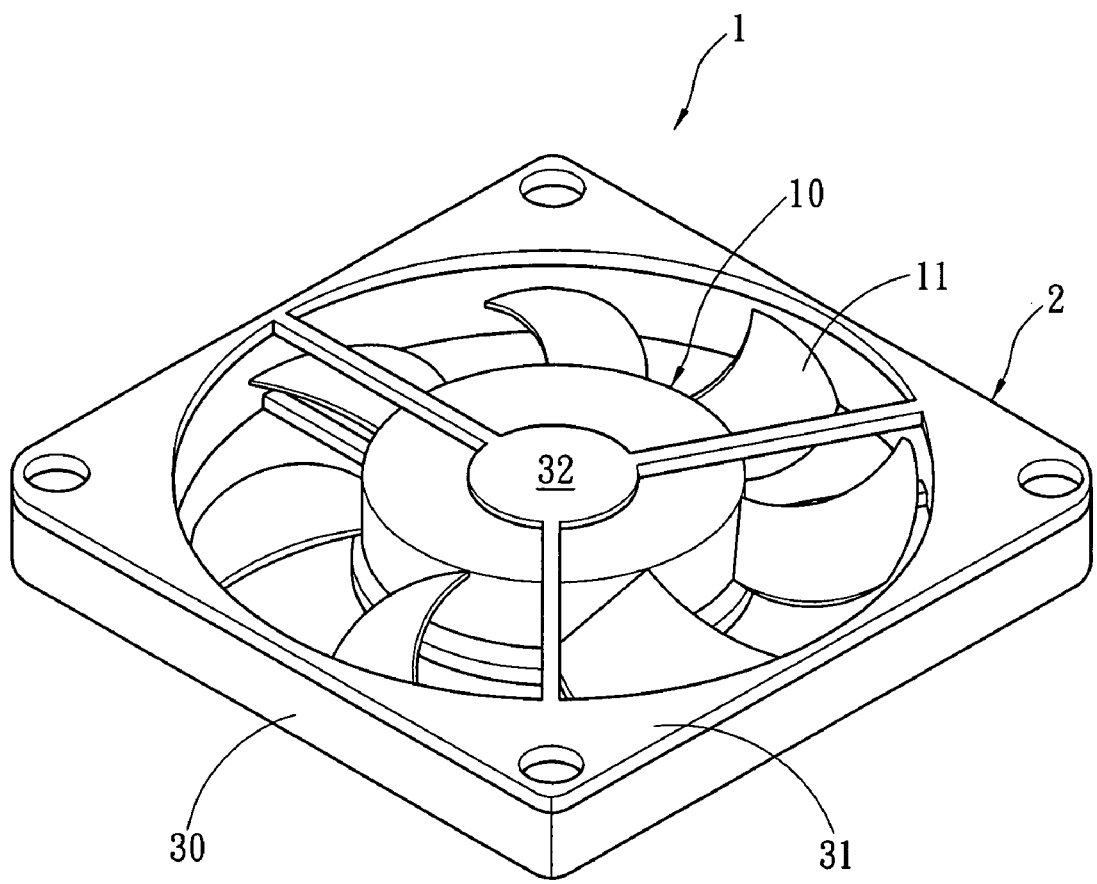
FIG. 1 is a perspective view of the present invention.
Figure 2:
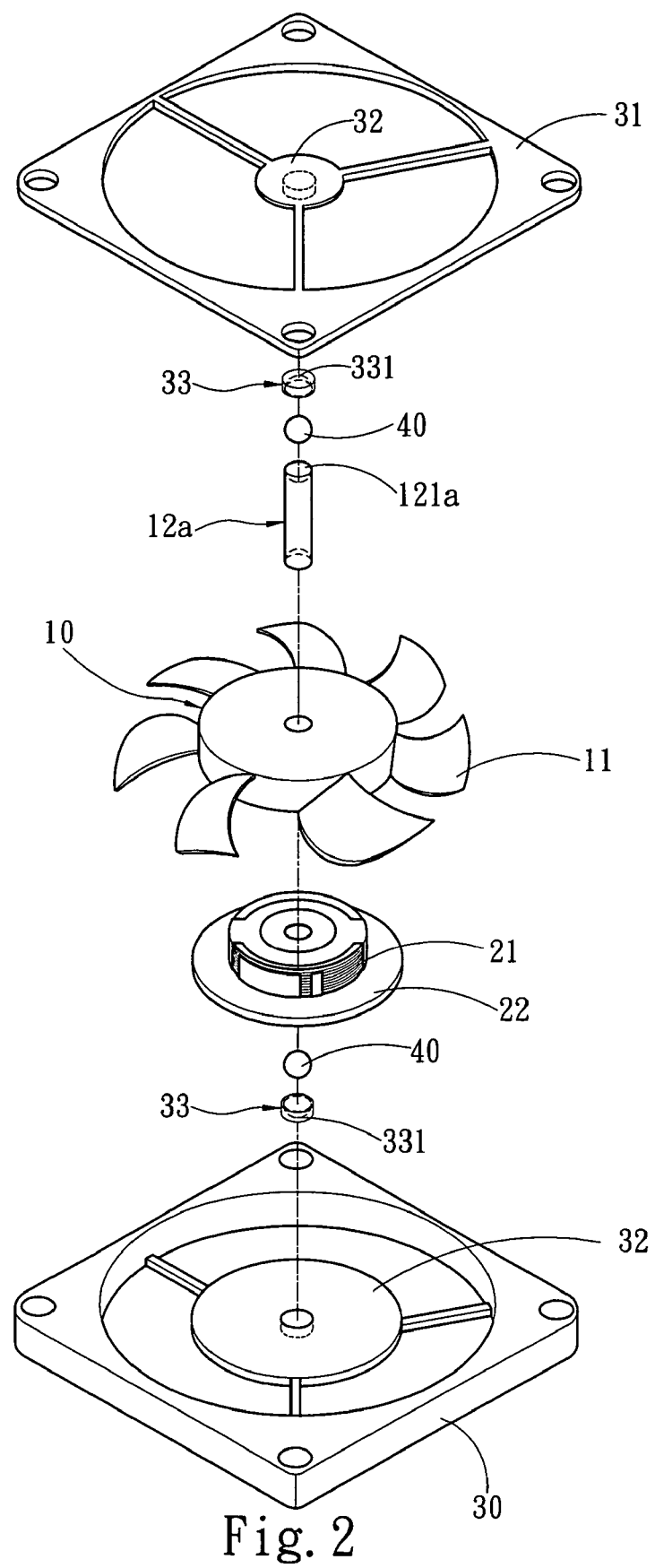
FIG. 2 is an exploded view of the present invention.
Figure 5:
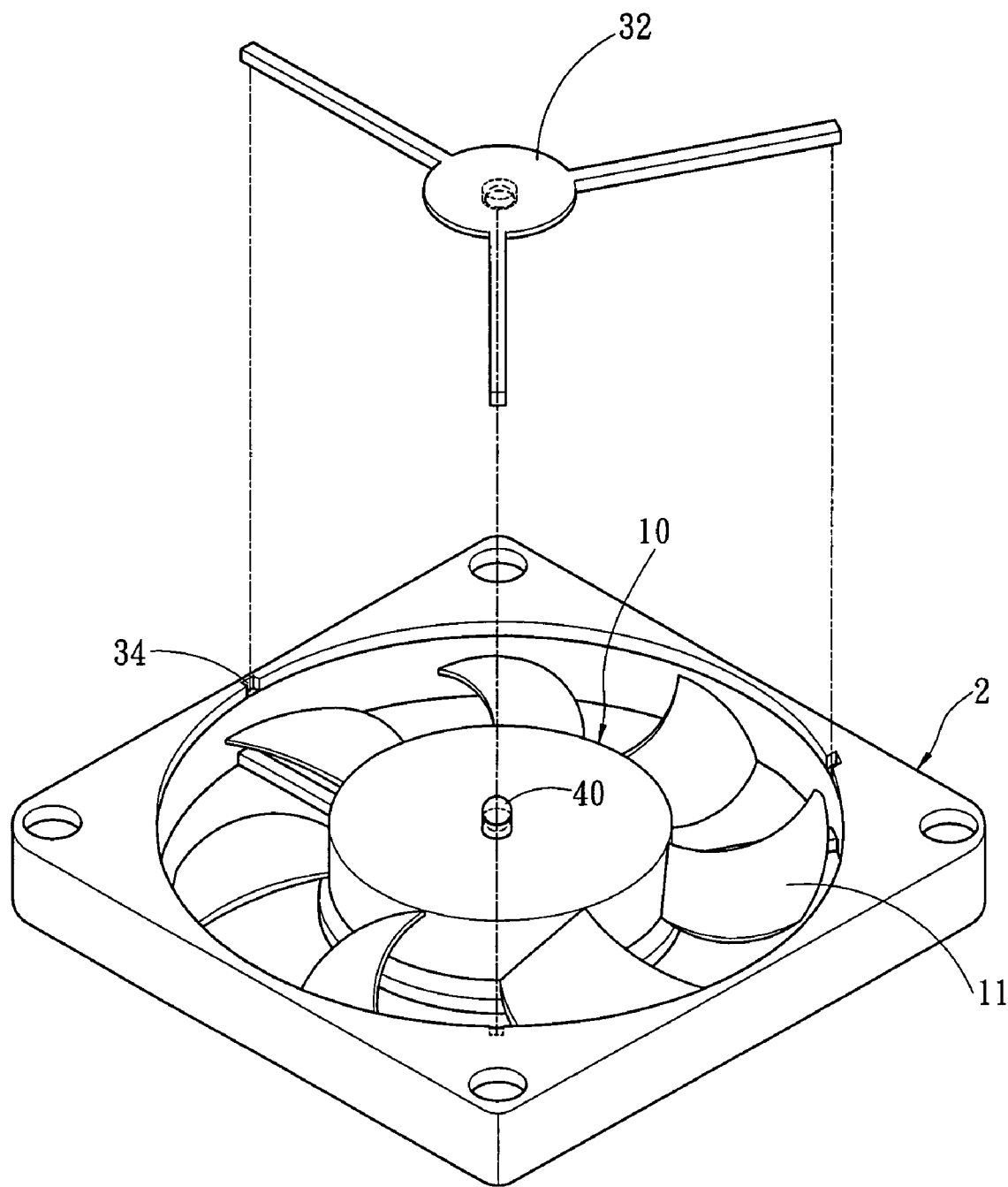
FIG. 5 is an exploded view of another embodiment of the present invention.

Please referring to FIGS. 1 and 2, the rotary structure for radiation fans of the invention mainly includes a radiation fan 1 which has a body 10 and a plurality of vanes 11 extended radially from the body 10. The body 10 is run through by a spindle 12a which has two rotary ends 121a on two sides of the body 10. Each of the rotary ends 121a is coupled with a sleeve 40. The radiation fan 1 is housed and rotates in a rotation space of a seat 2. The rotation space contains a driving mechanism to drive the radiation fan 1 (as shown in the drawings, the driving mechanism includes a coil set 21 and a circuit board 22 to receive and transform electric power to magnetic forces to drive the radiation fan 1 to rotate. The driving mechanism is known in the art and forms no part of the invention, thus details are omitted). The seat 2 further has two brackets 32 corresponding to the two rotary ends 121a. Each of the brackets 32 holds a bearing 33 corresponding to and holding the rotary end 121a so that the spindle 12a can rotate about a single axis. In a first embodiment of the invention, the bracket 32 is integrally formed with a holding member 30 and a lid 31 of the seat 2. Referring to FIG. 5, the seat 2 may also have an anchor portion 34 to hold the bracket 32 in a detachable manner.

Figure 3:
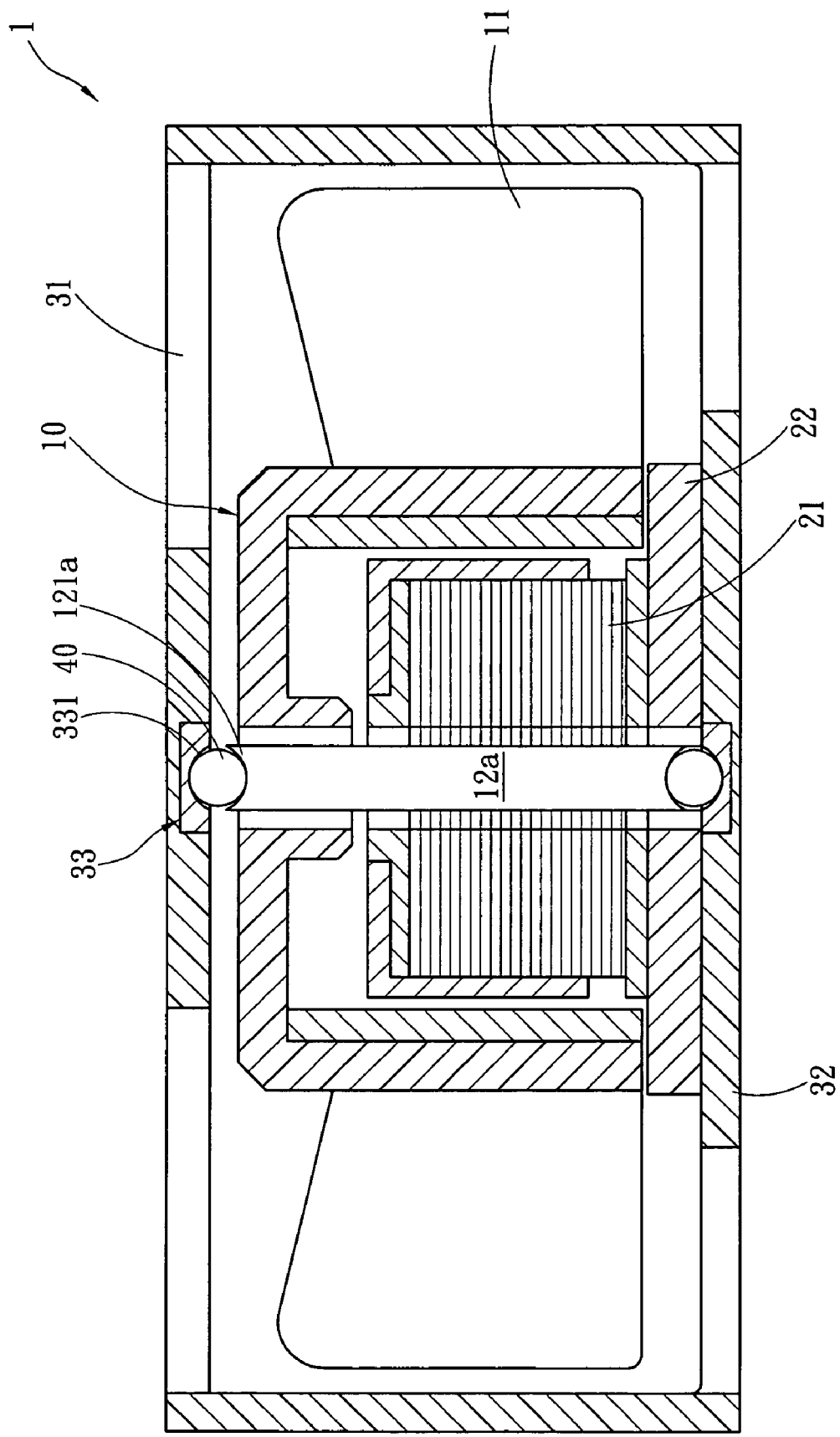
FIG. 3 is a sectional view of the present invention.

Referring to FIGS. 2 and 3, in an embodiment of the invention, the rotary end 121a is formed by indenting one end of the spindle 12a. The sleeve 40 is formed with a shape mating the rotary end 121a to become a confined rotation surface. Moreover, the bearing 33 of the bracket 32 also is indented to form a bucking portion 331. The sleeve 40 also mates the shape of the bucking portion 331 to become another confined rotation surface. Thus the two sleeves 40 can anchor two ends of the spindle to allow the radiation fan 1 to rotate about a single axis without escaping the sleeves 40. Skewing of the spindle 12a can be avoided, and impact and abnormal noise generation can be prevented.

Figure 4:
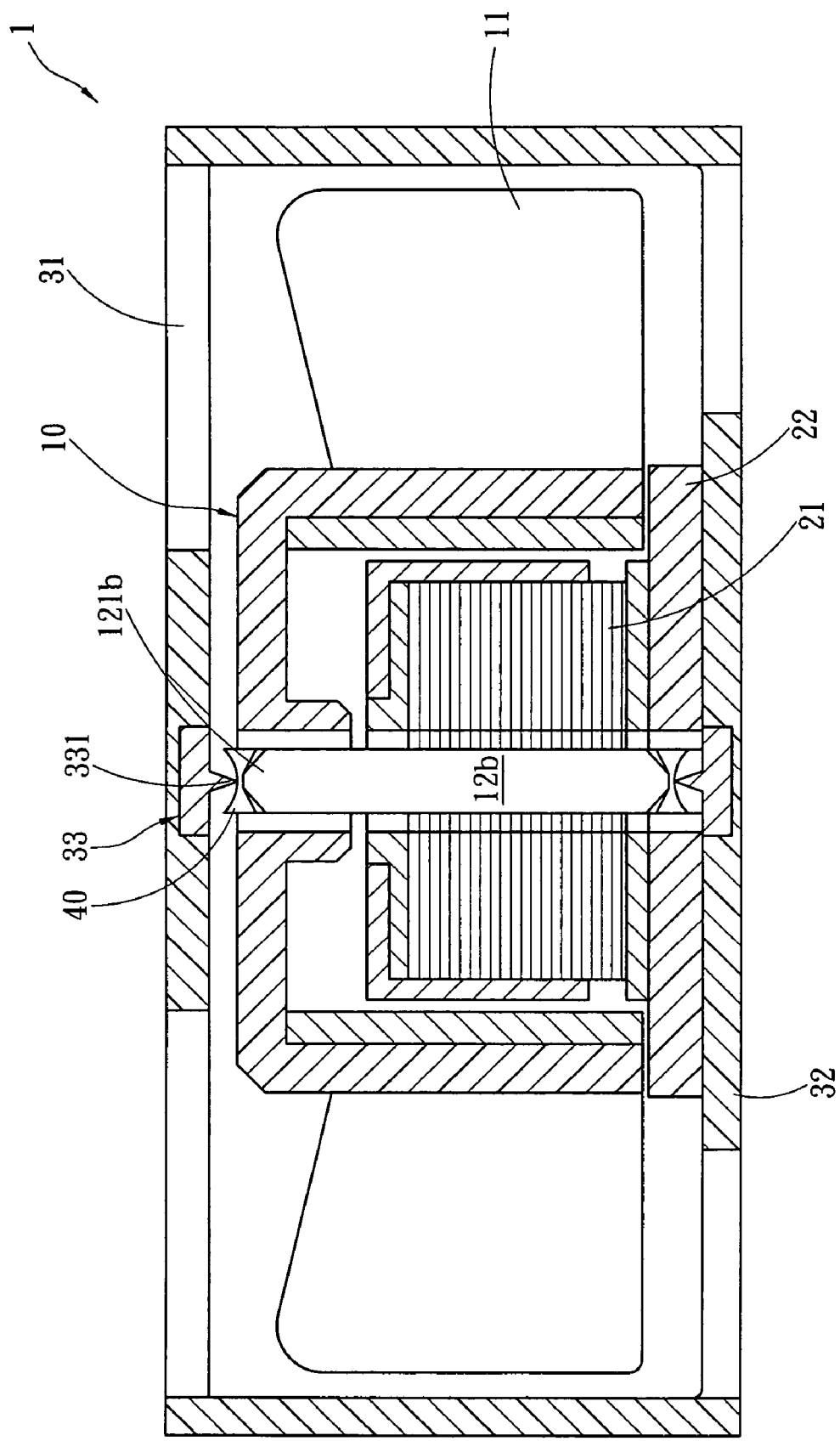
FIG. 4 is a sectional view of another embodiment of the present invention.

Refer to FIG. 4 for another embodiment of the invention. The rotary end 121b has a distal end formed in a conical shape and at an outer diameter smaller than the spindle 12b. Moreover, the rotary end 121b is formed by gradually shrinking the spindle 12b. The bearing 33 has a bucking portion 331 extending towards the sleeve 40. The bucking portion 331 has an outer diameter smaller than that of the spindle 12b. The sleeve 40 is corresponding to the shapes of the bucking portion 331 and the rotary end 121b to form a confined rotation surface. As previously discussed, the sleeves 40 can anchor two ends to allow the radiation fan 1 to rotate about a single axis without escaping. Thus skewing of the spindle 12b can be avoided, and impact and abnormal noise generation can be prevented.

In short, both embodiments set forth above can confine the two rotary ends of the spindle through the sleeves and bearings so that the radiation fan can rotate about a single axis. Various types of materials can be selected in the fabrication to suit high speed rotation of the radiation fan (such as wearing-resistant ceramic may be used to produce the sleeves and bearings). The frictional area is smaller and heat generation can be reduced.

While the preferred embodiments of the invention have been set forth for the purpose of disclosure, modifications of the disclosed embodiments of the invention as well as other embodiments thereof may occur to those skilled in the art.

Accordingly, the appended claims are intended to cover all embodiments which do not depart from the spirit and scope of the invention.

What is claimed is:

1. A rotary structure for radiation fans, comprising:
 a radiation fan including a body and vanes extended from the body, the vanes being coupled on a spindle which has two ends forming rotary ends, each of the rotary ends being coupled with a sleeve; and
 a seat having a rotation space to house the radiation fan and two sides coupling with two brackets which correspond to the two rotary ends, the two brackets holding and pressing the two sleeves to confine the two rotary ends to allow the spindle to rotate about a single axis;
 wherein each of the brackets holds a bearing corresponding to the sleeve with the bearing being extended towards the sleeve to form a bucking portion.

2. The rotary structure for radiation fans of claim 1, wherein the rotary ends have a diameter smaller than the spindle.

3. The rotary structure for radiation fans of claim 1, wherein the brackets are integrally formed with the seat.

4. The rotary structure for radiation fans of claim 1 wherein the seat has an anchor portion to couple with the brackets.

5. The rotary structure for radiation fans of claim 1, wherein the sleeves are formed with a shape corresponding to the rotary ends to form a confined rotation surface.

6. The rotary structure for radiation fans of claim 1, wherein the bucking portion has an outer diameter smaller than that of the spindle.

7. The rotary structure for radiation fans of claim 1, wherein the sleeve has a confined rotation surface corresponding to the shape of the bucking portion.

* * * * *